US012775620B2

(12) United States Patent
Kumar et al.

(10) Patent No.: US 12,775,620 B2
(45) Date of Patent: Oct. 27, 2026

(54) SYSTEM, METHOD, AND COMPUTER PROGRAM PRODUCT FOR DYNAMIC OPTIMIZATION OF COMPLEX QUERIES IN DATA LAKEHOUSE QUERY ENGINES

(71) Applicant: Visa International Service Association, San Francisco, CA (US)

(72) Inventors: Udit Kumar, Bengaluru (IN); Madhumita Mallick, Bengaluru (IN); Gunjan Singh, Bengaluru (IN); Mahadev Khapali, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/901,231

(22) Filed: Sep. 30, 2024

(65) Prior Publication Data

US 2026/0093699 A1 Apr. 2, 2026

(51) Int. Cl.

| | |
|---|---|
| ***G06F 16/28*** | (2019.01) |
| ***G06F 16/2452*** | (2019.01) |
| ***G06F 16/2453*** | (2019.01) |
| ***G06F 16/2458*** | (2019.01) |

(52) U.S. Cl.

CPC .. *G06F 16/24545* (2019.01); *G06F 16/24526* (2019.01); *G06F 16/2471* (2019.01); *G06F 16/285* (2019.01)

(58) Field of Classification Search

None

See application file for complete search history.

(56) References Cited

U.S. PATENT DOCUMENTS

| | | | |
|---|---|---|---|
| 11,061,902 B2 | 7/2021 | Idicula et al. | |
| 11,782,926 B2 | 10/2023 | Idicula et al. | |
| 12,073,441 B2 | 8/2024 | Peng et al. | |
| 2023/0043579 A1* | 2/2023 | Chitalwala | G06F 9/5077 |

OTHER PUBLICATIONS

Venkata Vamsikrishna Meduri; Evaluation of Machine Learning Algorithms in Predicting the Next SQL Query from the Future; ACM; pp. 1-46 (Year: 2021).*

Tang et al., "Forecasting SQL Query Cost at Twitter", Twitter Inc., Apr. 12, 2022, 7 pp., arXiv:2204.05529v1.

* cited by examiner

*Primary Examiner* — Ann J Lo
*Assistant Examiner* — Jermaine A Mincey
(74) *Attorney, Agent, or Firm* — The Webb Law Firm

(57) ABSTRACT

Systems, methods, and computer program products for dynamic optimization of complex SQL queries in data lakehouse query engines are provided. An example system may include at least one processor configured to receive data associated with operations of computational resources of a computer cluster receive data associated with a query to be carried out by the computer cluster during a time interval, provide an input to a cluster load machine learning model to generate an output of the cluster load machine learning model, where the output comprises a prediction of load on the computer cluster during the time interval, determine to adjust at least one session parameter associated with the query, and adjust the at least one session parameter associated with the query based on determining to adjust the at least one session parameter associated with the query.

20 Claims, 10 Drawing Sheets

SYSTEM, METHOD, AND COMPUTER PROGRAM PRODUCT FOR DYNAMIC OPTIMIZATION OF COMPLEX QUERIES IN DATA LAKEHOUSE QUERY ENGINES

BACKGROUND

1. Technical Field

This disclosure relates generally to optimization of database SQL queries and, in some non-limiting embodiments or aspects, to systems, methods, and computer program products for dynamic optimization of complex SQL queries in data lakehouse query engines.

2. Technical Considerations

A computer network may include a set of computers sharing computational resources located on and/or provided by network nodes. Computers in a computer network may use common communication protocols over interconnections to communicate with each other. These interconnections may be made up of telecommunication network technologies based on physically wired, optical, and/or wireless radio-frequency methods that may be arranged in a variety of network topologies.

A distributed computing system may involve the use of a group of computers that include inter-communicating components that are located on different networked computers to communicate and/or coordinate actions by passing messages to one another in order to achieve a common goal.

A distributed query engine, such as a lakehouse distributed Structured Query Language (SQL) engine, may refer to a software system designed to execute queries across multiple servers, nodes, and/or data sources in a distributed computing system. Instead of relying on a single machine to process a query, a distributed query engine may break down a query into smaller tasks and executes them in parallel across multiple nodes. These nodes may have access to different parts of the data or different data sources, which the engine efficiently coordinates to produce a unified result.

However, in an enterprise, such a distributed query engine may be extensively used for fetching data, such as through business intelligence (BI) queries or batch queries. With this, because of the load on the distributed query engine (e.g., load in the form of a number of queries being executed by the distributed query engine) the speed at which some queries are processed is reduced and/or the speed at which some queries are processed is impacted by neighboring queries (e.g., queries that are adjacent in time).

SUMMARY

Accordingly, provided are improved methods, systems, and computer program products for dynamic optimization of complex SQL queries in data lakehouse query engines.

According to non-limiting embodiments or aspects, provided is a system for dynamic optimization of complex SQL queries in data lakehouse query engines, that includes at least one processor configured to: receive data associated with operations of computational resources of a computer cluster, receive data associated with a query to be carried out by the computer cluster during a time interval, provide an input to a cluster load machine learning model to generate an output of the cluster load machine learning model, wherein the output comprises a prediction of load on the computer cluster required to carry out operations during the time interval, determine whether to adjust at least one session parameter associated with the query based on an output of the cluster load machine learning model, the data associated with computational resources of the computer cluster, and the data associated with a query to be carried out by the computer cluster, adjust the at least one session parameter associated with the query based on determining to adjust the at least one session parameter associated with the query, and forego adjusting the at least one session parameter associated with the query based on determining not to adjust the at least one session parameter associated with the query.

In some non-limiting embodiments or aspects, the at least one session parameter associated with the query comprises at least one of the following: a parameter associated with task concurrency for the computer cluster; a parameter associated with resource overcommit for the computer cluster; a parameter associated with a maximum hash partition count; a parameter associated with a join distribution type of the query; a parameter associated with an execution policy for the query; or any combination thereof.

In some non-limiting embodiments or aspects, the at least one processor is further configured to: train the cluster load machine learning model based on historical time-series data associated with operations of computational resources of the computer cluster.

In some non-limiting embodiments or aspects, the historical time-series data associated with operations of computational resources of the computer cluster may include a plurality of timestamps associated with a plurality of features, and wherein the plurality of features associated with each timestamp may include at least one of the following: a feature associated with a number of concurrent queries for the computer cluster; a feature associated with an amount of memory available for the computer cluster; a feature associated with an amount of central processing unit resource available for the computer cluster; a feature associated with a number of threads for the computer cluster; a feature associated with an amount of information transmitted in a network associated with the computer cluster; or any combination thereof.

In some non-limiting embodiments or aspects, when receiving the data associated with operations of computational resources of the computer cluster, the at least one processor is configured to: receive real time data associated with operations of computational resources of the computer cluster; and wherein, when providing the input to a cluster load machine learning model to generate the output of the cluster load machine learning model, the at least one processor is configured to: provide the real time data associated with operations of computational resources of the computer cluster as the input to a cluster load machine learning model to generate the output of the cluster load machine learning model; wherein the at least one processor is further configured to: generate the output of the cluster load machine learning model, wherein the output may include a prediction of real time load on the computer cluster required to carry out operations during the time interval for the query.

In some non-limiting embodiments or aspects, when adjusting the at least one session parameter associated with the query, the at least one processor is configured to: generate an adjusted query based on adjusting the at least one session parameter associated with the query; and wherein the at least one processor is further configured to: perform the adjusted query on a data lakehouse based on generating the adjusted query.

In some non-limiting embodiments or aspects, when receiving the data associated with the query to be carried out by the computer cluster during the time interval, the at least one processor is configured to: receive data associated with a Structured Query Language (SQL) query to be carried out by the computer cluster during the time interval; and wherein, when determining whether to adjust the at least one session parameter associated with the query, the at least one processor is configured to: determine to adjust at least one session parameter associated with the SQL query.

According to non-limiting embodiments or aspects, provided is a computer implemented method for dynamic optimization of complex SQL queries in data lakehouse query engines, that includes receiving, with at least one processor, data associated with operations of computational resources of a computer cluster, receiving, with at least one processor, data associated with a query to be carried out by the computer cluster during a time interval, providing, with at least one processor, an input to a cluster load machine learning model to generate an output of the cluster load machine learning model, wherein the output may include a prediction of load on the computer cluster required to carry out operations during the time interval, determining, with at least one processor, to adjust at least one session parameter associated with the query based on an output of the cluster load machine learning model, the data associated with computational resources of the computer cluster, and the data associated with a query to be carried out by the computer cluster, and adjusting, with at least one processor, the at least one session parameter associated with the query based on determining to adjust the at least one session parameter associated with the query.

In some non-limiting embodiments or aspects, the at least one session parameter associated with the query may include at least one of the following: a parameter associated with task concurrency for the computer cluster; a parameter associated with resource overcommit for the computer cluster; a parameter associated with a maximum hash partition count; a parameter associated with a join distribution type of the query; a parameter associated with an execution policy for the query; or any combination thereof.

In some non-limiting embodiments or aspects, the method further may include: training the cluster load machine learning model based on historical time-series data associated with operations of computational resources of the computer cluster.

In some non-limiting embodiments or aspects, the historical time-series data associated with operations of computational resources of the computer cluster may include a plurality of timestamps associated with a plurality of features, and wherein the plurality of features associated with each timestamp may include at least one of the following: a feature associated with a number of concurrent queries for the computer cluster; a feature associated with an amount of memory available for the computer cluster; a feature associated with an amount of central processing unit resource available for the computer cluster; a feature associated with a number of threads for the computer cluster; a feature associated with an amount of information transmitted in a network associated with the computer cluster; or any combination thereof.

In some non-limiting embodiments or aspects, receiving the data associated with operations of computational resources of the computer cluster may include: receiving real time data associated with operations of computational resources of the computer cluster; and wherein providing the input to a cluster load machine learning model to generate the output of the cluster load machine learning model may include: providing the real time data associated with operations of computational resources of the computer cluster as the input to a cluster load machine learning model to generate the output of the cluster load machine learning model; wherein the method further may include: generating the output of the cluster load machine learning model, wherein the output may include a prediction of real time load on the computer cluster required to carry out operations during the time interval for the query.

In some non-limiting embodiments or aspects, adjusting the at least one session parameter associated with the query may include: generating an adjusted query based on adjusting the at least one session parameter associated with the query; and wherein the method further comprising: performing the adjusted query on a data lakehouse based on generating the adjusted query.

In some non-limiting embodiments or aspects, receiving the data associated with the query to be carried out by the computer cluster during the time interval may include: receiving data associated with a Structured Query Language (SQL) query to be carried out by the computer cluster during the time interval; and wherein determining whether to adjust the at least one session parameter associated with the query may include: determining to adjust at least one session parameter associated with the SQL query.

According to non-limiting embodiments or aspects, provided is a computer program product for dynamic optimization of complex SQL queries in data lakehouse query engines, that includes at least one non-transitory computer-readable medium including program instructions that, when executed by at least one processor, cause the at least one processor to receive data associated with operations of computational resources of a computer cluster, receive data associated with a query to be carried out by the computer cluster during a time interval, provide an input to a cluster load machine learning model to generate an output of the cluster load machine learning model, wherein the output may include a prediction of load on the computer cluster required to carry out operations during the time interval, determine whether to adjust at least one session parameter associated with the query based on an output of the cluster load machine learning model, the data associated with computational resources of the computer cluster, and the data associated with a query to be carried out by the computer cluster, adjust the at least one session parameter associated with the query based on determining to adjust the at least one session parameter associated with the query, and forego adjusting the at least one session parameter associated with the query based on determining not to adjust the at least one session parameter associated with the query.

In some non-limiting embodiments or aspects, the at least one session parameter associated with the query may include at least one of the following: a parameter associated with task concurrency for the computer cluster; a parameter associated with resource overcommit for the computer cluster; a parameter associated with a maximum hash partition count; a parameter associated with a join distribution type of the query; a parameter associated with an execution policy for the query; or any combination thereof.

In some non-limiting embodiments or aspects, the program instructions further cause the at least one processor to: train the cluster load machine learning model based on historical time-series data associated with operations of computational resources of the computer cluster.

In some non-limiting embodiments or aspects, the historical time-series data associated with operations of computational resources of the computer cluster may include a plurality of timestamps associated with a plurality of features, and wherein the plurality of features associated with each timestamp may include at least one of the following: a feature associated with a number of concurrent queries for the computer cluster; a feature associated with an amount of memory available for the computer cluster; a feature associated with an amount of central processing unit resource available for the computer cluster; a feature associated with a number of threads for the computer cluster; a feature associated with an amount of information transmitted in a network associated with the computer cluster; or any combination thereof.

In some non-limiting embodiments or aspects, the program instructions that cause the at least one processor to receive the data associated with operations of computational resources of the computer cluster, cause the at least one processor to: receive real time data associated with operations of computational resources of the computer cluster; and wherein, the program instructions that cause the at least one processor to provide the input to a cluster load machine learning model to generate the output of the cluster load machine learning model, cause the at least one processor to: provide the real time data associated with operations of computational resources of the computer cluster as the input to a cluster load machine learning model to generate the output of the cluster load machine learning model; wherein the program instructions further cause the at least one processor to: generate the output of the cluster load machine learning model, wherein the output may include a prediction of real time load on the computer cluster required to carry out operations during the time interval for the query.

Further non-limiting embodiments or aspects will be set forth in the following numbered clauses:

Clause 1: A system, comprising: at least one processor configured to: receive data associated with operations of computational resources of a computer cluster; receive data associated with a query to be carried out by the computer cluster during a time interval; provide an input to a cluster load machine learning model to generate an output of the cluster load machine learning model, wherein the output comprises a prediction of load on the computer cluster required to carry out operations during the time interval; determine whether to adjust at least one session parameter associated with the query based on an output of the cluster load machine learning model, the data associated with computational resources of the computer cluster, and the data associated with a query to be carried out by the computer cluster; adjust the at least one session parameter associated with the query based on determining to adjust the at least one session parameter associated with the query; and forego adjusting the at least one session parameter associated with the query based on determining not to adjust the at least one session parameter associated with the query.

Clause 2: The system of claim 1, wherein the at least one session parameter associated with the query comprises at least one of the following: a parameter associated with task concurrency for the computer cluster; a parameter associated with resource overcommit for the computer cluster; a parameter associated with a maximum hash partition count; a parameter associated with a join distribution type of the query; a parameter associated with an execution policy for the query; or any combination thereof.

Clause 3: The system of claim 1, wherein the at least one processor is further configured to: train the cluster load machine learning model based on historical time-series data associated with operations of computational resources of the computer cluster.

Clause 4: The system of claim 3, wherein the historical time-series data associated with operations of computational resources of the computer cluster comprises a plurality of timestamps associated with a plurality of features, and wherein the plurality of features associated with each timestamp comprises at least one of the following: a feature associated with a number of concurrent queries for the computer cluster; a feature associated with an amount of memory available for the computer cluster; a feature associated with an amount of central processing unit resource available for the computer cluster; a feature associated with a number of threads for the computer cluster; a feature associated with an amount of information transmitted in a network associated with the computer cluster; or any combination thereof.

Clause 5: The system of claim 1, wherein, when receiving the data associated with operations of computational resources of the computer cluster, the at least one processor is configured to: receive real time data associated with operations of computational resources of the computer cluster; and wherein, when providing the input to a cluster load machine learning model to generate the output of the cluster load machine learning model, the at least one processor is configured to: provide the real time data associated with operations of computational resources of the computer cluster as the input to a cluster load machine learning model to generate the output of the cluster load machine learning model; wherein the at least one processor is further configured to: generate the output of the cluster load machine learning model, wherein the output comprises a prediction of real time load on the computer cluster required to carry out operations during the time interval for the query.

Clause 6: The system of claim 1, wherein, when adjusting the at least one session parameter associated with the query, the at least one processor is configured to: generate an adjusted query based on adjusting the at least one session parameter associated with the query; and wherein the at least one processor is further configured to: perform the adjusted query on a data lakehouse based on generating the adjusted query.

Clause 7: The system of claim 1, wherein, when receiving the data associated with the query to be carried out by the computer cluster during the time interval, the at least one processor is configured to: receive data associated with a Structured Query Language (SQL) query to be carried out by the computer cluster during the time interval; and wherein, when determining whether to adjust the at least one session parameter associated with the query, the at least one processor is configured to: determine to adjust at least one session parameter associated with the SQL query.

Clause 8: A computer-implemented method, comprising: receiving, with at least one processor, data associated with operations of computational resources of a computer cluster; receiving, with at least one processor, data associated with a query to be carried out by the computer cluster during a time interval; providing, with at least one processor, an input to a cluster load machine learning model to generate an output of the cluster load machine learning model, wherein the output comprises a prediction of load on the computer cluster required to carry out operations during the time interval; determining, with at least one processor, to adjust at least one session parameter associated with the query based on an output of the cluster load machine learning model, the data associated with computational resources of the computer cluster, and the data associated with a query to be carried out by the computer cluster; and adjusting, with at least one processor, the at least one session parameter associated with the query based on determining to adjust the at least one session parameter associated with the query.

Clause 9: The computer-implemented method of claim 8, wherein the at least one session parameter associated with the query comprises at least one of the following: a parameter associated with task concurrency for the computer cluster; a parameter associated with resource overcommit for the computer cluster; a parameter associated with a maximum hash partition count; a parameter associated with a join distribution type of the query; a parameter associated with an execution policy for the query; or any combination thereof.

Clause 10: The computer-implemented method of claim 8, further comprising: training the cluster load machine learning model based on historical time-series data associated with operations of computational resources of the computer cluster.

Clause 11: The computer-implemented method of claim 10, wherein the historical time-series data associated with operations of computational resources of the computer cluster comprises a plurality of timestamps associated with a plurality of features, and wherein the plurality of features associated with each timestamp comprises at least one of the following: a feature associated with a number of concurrent queries for the computer cluster; a feature associated with an amount of memory available for the computer cluster; a feature associated with an amount of central processing unit resource available for the computer cluster; a feature associated with a number of threads for the computer cluster; a feature associated with an amount of information transmitted in a network associated with the computer cluster; or any combination thereof.

Clause 12: The computer-implemented method of claim 8, wherein receiving the data associated with operations of computational resources of the computer cluster comprises: receiving real time data associated with operations of computational resources of the computer cluster; and wherein providing the input to a cluster load machine learning model to generate the output of the cluster load machine learning model comprises: providing the real time data associated with operations of computational resources of the computer cluster as the input to a cluster load machine learning model to generate the output of the cluster load machine learning model; wherein the method further comprises: generating the output of the cluster load machine learning model, wherein the output comprises a prediction of real time load on the computer cluster required to carry out operations during the time interval for the query.

Clause 13: The computer-implemented method of claim 8, wherein adjusting the at least one session parameter associated with the query comprises: generating an adjusted query based on adjusting the at least one session parameter associated with the query; and wherein the method further comprising: performing the adjusted query on a data lakehouse based on generating the adjusted query.

Clause 14: The computer-implemented method of claim 8, wherein receiving the data associated with the query to be carried out by the computer cluster during the time interval comprises: receiving data associated with a Structured Query Language (SQL) query to be carried out by the computer cluster during the time interval; and wherein determining whether to adjust the at least one session parameter associated with the query comprises: determining to adjust at least one session parameter associated with the SQL query.

Clause 15: A computer program product, comprising at least one non-transitory computer-readable medium including program instructions that, when executed by at least one processor, cause the at least one processor to: receive data associated with operations of computational resources of a computer cluster; receive data associated with a query to be carried out by the computer cluster during a time interval; provide an input to a cluster load machine learning model to generate an output of the cluster load machine learning model, wherein the output comprises a prediction of load on the computer cluster required to carry out operations during the time interval; determine whether to adjust at least one session parameter associated with the query based on an output of the cluster load machine learning model, the data associated with computational resources of the computer cluster, and the data associated with a query to be carried out by the computer cluster; adjust the at least one session parameter associated with the query based on determining to adjust the at least one session parameter associated with the query; and forego adjusting the at least one session parameter associated with the query based on determining not to adjust the at least one session parameter associated with the query.

Clause 16: The computer program product of claim 15, wherein the at least one session parameter associated with the query comprises at least one of the following: a parameter associated with task concurrency for the computer cluster; a parameter associated with resource overcommit for the computer cluster; a parameter associated with a maximum hash partition count; a parameter associated with a join distribution type of the query; a parameter associated with an execution policy for the query; or any combination thereof.

Clause 17: The computer program product of claim 15, wherein the program instructions further cause the at least one processor to: train the cluster load machine learning model based on historical time-series data associated with operations of computational resources of the computer cluster.

Clause 18: The computer program product of claim 17, wherein the historical time-series data associated with operations of computational resources of the computer cluster comprises a plurality of timestamps associated with a plurality of features, and wherein the plurality of features associated with each timestamp comprises at least one of the following: a feature associated with a number of concurrent queries for the computer cluster; a feature associated with an amount of memory available for the computer cluster; a feature associated with an amount of central processing unit resource available for the computer cluster; a feature associated with a number of threads for the computer cluster; a feature associated with an amount of information transmitted in a network associated with the computer cluster; or any combination thereof.

Clause 19: The computer program product of claim 15, wherein, the program instructions that cause the at least one processor to receive the data associated with operations of computational resources of the computer cluster, cause the at least one processor to: receive real time data associated with operations of computational resources of the computer cluster; and wherein, the program instructions that cause the at least one processor to provide the input to a cluster load machine learning model to generate the output of the cluster load machine learning model, cause the at least one processor to: provide the real time data associated with operations of computational resources of the computer cluster as the input to a cluster load machine learning model to generate the output of the cluster load machine learning model; wherein the program instructions further cause the at least one processor to: generate the output of the cluster load machine learning model, wherein the output comprises a prediction of real time load on the computer cluster required to carry out operations during the time interval for the query.

Clause 20: The computer program product of claim 15, wherein, the program instructions that cause the at least one processor to receive the data associated with the query to be carried out by the computer cluster during the time interval, cause the at least one processor to: receive data associated with a Structured Query Language (SQL) query to be carried out by the computer cluster during the time interval; and wherein, the program instructions that cause the at least one processor to determine whether to adjust the at least one session parameter associated with the query, cause the at least one processor to: determine to adjust at least one session parameter associated with the SQL query; wherein, the program instructions that cause the at least one processor to adjust the at least one session parameter associated with the query, cause the at least one processor to: generate an adjusted SQL query based on adjusting the at least one session parameter associated with the SQL query; and wherein the program instructions further cause the at least one processor to: perform the adjusted SQL query on a data lakehouse based on generating the adjusted SQL query.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
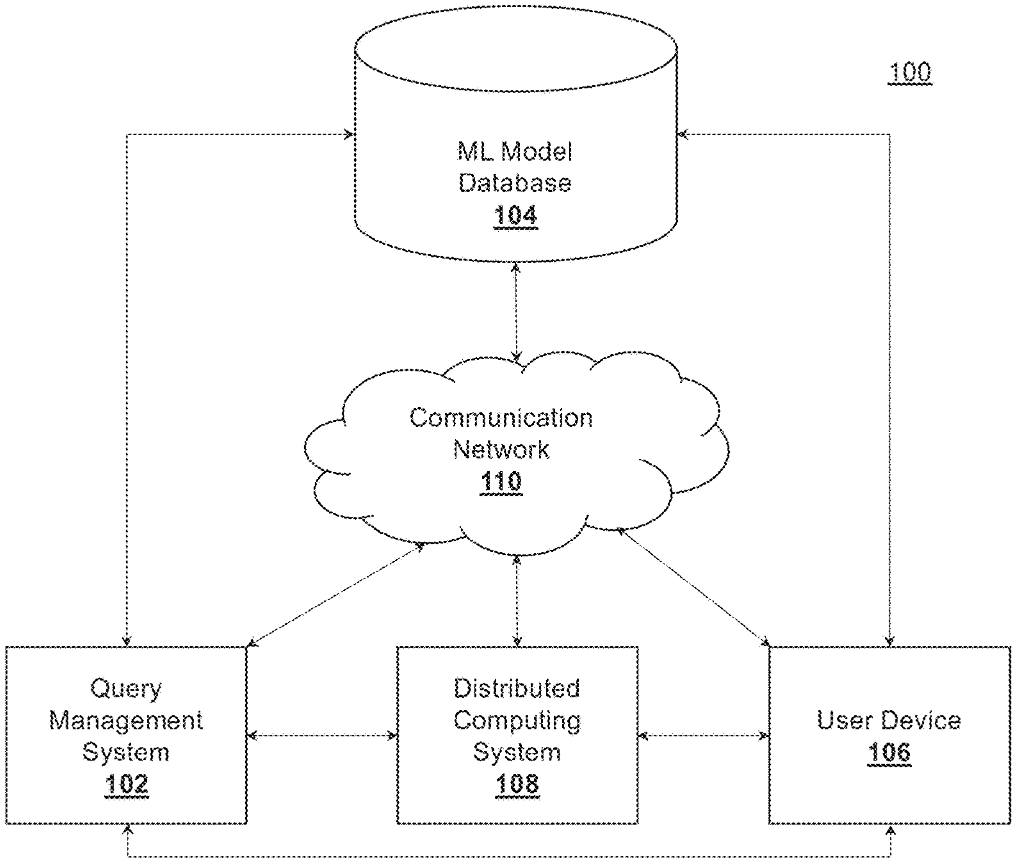
FIG. 1 is a schematic diagram of a system for dynamic optimization of complex SQL queries in data lakehouse query engines, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second units. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to an electronic payment device, a portable financial device (e.g., a payment card, such as a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for dynamic optimization of complex SQL queries in data lakehouse query engines. The disclosed subject matter may include a query management system that is configured to receive data associated with operations of computational resources of a computer cluster, receive data associated with a query to be carried out by the computer cluster during a time interval, provide an input to a cluster load machine learning model to generate an output of the cluster load machine learning model, wherein the output comprises a prediction of load on the computer cluster required to carry out operations during the time interval, determine whether to adjust at least one session parameter associated with the query based on an output of the cluster load machine learning model, the data associated with computational resources of the computer cluster, and the data associated with a query to be carried out by the computer cluster, adjust the at least one session parameter associated with the query based on determining to adjust the at least one session parameter associated with the query, and forego adjusting the at least one session parameter associated with the query based on determining not to adjust the at least one session parameter associated with the query.

In some non-limiting embodiments or aspects, the at least one session parameter associated with the query may include at least one of the following: a parameter associated with task concurrency for the computer cluster, a parameter associated with resource overcommit for the computer cluster, a parameter associated with a maximum hash partition count, a parameter associated with a join distribution type of the query, a parameter associated with an execution policy for the query, or any combination thereof.

In some non-limiting embodiments or aspects, the at least one processor is further configured to train the cluster load machine learning model based on historical time-series data associated with operations of computational resources of the computer cluster. In some non-limiting embodiments or aspects, the historical time-series data associated with operations of computational resources of the computer cluster comprises a plurality of timestamps associated with a plurality of features, and wherein the plurality of features associated with each timestamp comprises at least one of the following: a feature associated with a number of concurrent queries for the computer cluster, a feature associated with an amount of memory available for the computer cluster, a feature associated with an amount of central processing unit resource available for the computer cluster, a feature associated with a number of threads for the computer cluster, a feature associated with an amount of information transmitted in a network associated with the computer cluster, or any combination thereof.

In some non-limiting embodiments or aspects, when receiving the data associated with operations of computational resources of the computer cluster, the query management system is configured to receive real time data associated with operations of computational resources of the computer cluster, and, when providing the input to a cluster load machine learning model to generate the output of the cluster load machine learning model, the query management system is configured to provide the real time data associated with operations of computational resources of the computer cluster as the input to a cluster load machine learning model to generate the output of the cluster load machine learning model, wherein the query management system is further configured to generate the output of the cluster load machine learning model, wherein the output comprises a prediction of real time load on the computer cluster required to carry out operations during the time interval for the query.

In some non-limiting embodiments or aspects, when adjusting the at least one session parameter associated with the query, the query management system is configured to generate an adjusted query based on adjusting the at least one session parameter associated with the query, and wherein the query management system is further configured to perform the adjusted query on a data lakehouse based on generating the adjusted query.

In some non-limiting embodiments or aspects, when receiving the data associated with the query to be carried out by the computer cluster during the time interval, the query management system is configured to receive data associated with a Structured Query Language (SQL) query to be carried out by the computer cluster during the time interval, and wherein, when determining whether to adjust the at least one session parameter associated with the query, the query management system is configured to determine to adjust at least one session parameter associated with the SQL query.

In this way, the query management system may ensure that a query is executed with one or more adjusted session parameters that optimally utilizes the available resources on a computer cluster (e.g., of a distributed computing system). With this, the query management system may reduce memory errors, shorten query durations, and/or minimize wait times in an execution queue.

For the purpose of illustration, in the following description, while the presently disclosed subject matter is described with respect to systems, methods, and computer program products for dynamic optimization of complex SQL queries in data lakehouse query engines, one skilled in the art will recognize that the disclosed subject matter is not limited to the non-limiting embodiments or aspects disclosed herein. For example, the systems, methods, and computer program products described herein may be used with a wide variety of settings, such as data structure queries (e.g., any form of data structure that may be queried, such as database, a data warehouse, a data lake, etc.) that are used for making determinations, such settings may include fraud detection/prevention, authorization, authentication, identification, product recommendation, and/or the like.

Referring now to FIG. 1, shown is example system 100 for dynamic optimization of complex SQL queries in data lakehouse query engines, according to some non-limiting embodiments or aspects. For example, system 100 may include query management system 102, machine learning (ML) model database 104, user device 106, distributed computing system 108, and/or communication network 110.

Query management system 102 may include one or more devices capable of receiving information from and/or communicating information to ML model database 104, user device 106, and/or distributed computing system 108 (e.g., directly via wired or wireless communication connection, indirectly via communication network 110, and/or the like). For example, query management system 102 may include a computing device, such as a server, a group of servers, a desktop computer, a portable computer, a mobile device, and/or other like devices. In some non-limiting embodiments or aspects, query management system 102 may be in communication with a data storage device (e.g., ML model database 104), which may be local or remote to query management system 102. In some non-limiting embodiments or aspects, query management system 102 may be capable of receiving information from, storing information in, communicating information to, or searching information stored in the data storage device (e.g., ML model database 104).

ML model database 104 may include one or more devices capable of receiving information from and/or communicating information to query management system 102 and/or user device 106 (e.g., directly via wired or wireless communication connection, indirectly via communication network 110, and/or the like). For example, ML model database 104 may include a computing device, such as a server, a group of servers, a desktop computer, a portable computer, a mobile device, and/or other like devices. In some non-limiting embodiments or aspects, ML model database 104 may include a data storage device. In some non-limiting embodiments or aspects, ML model database 104 may be capable of receiving information from, storing information in, communicating information to, or searching information stored in the data storage device. In some non-limiting embodiments or aspects, ML model database 104 may be part of query management system 102 and/or part of the same system as query management system 102.

User device 106 may include one or more devices capable of receiving information from and/or communicating information to query management system 102 and/or ML model database 104 (e.g., directly via wired or wireless communication connection, indirectly via communication network 110, and/or the like). For example, user device 106 may include a computing device, such as a mobile device, a portable computer, a desktop computer, and/or other like devices. Additionally or alternatively, each user device 106 may include a device capable of receiving information from and/or communicating information to other user devices 106 (e.g., directly via wired or wireless communication connection, indirectly via communication network 110, and/or the like). In some non-limiting embodiments or aspects, user device 106 may be part of query management system 102 and/or part of the same system as query management system 102. For example, query management system 102, ML model database 104, and user device 106 may all be (and/or be part of) a single system and/or a single computing device.

Distributed computing system 108 may include one or more devices capable of receiving information from and/or communicating information to computing management system 102, ML model database 104, and/or user device 106 (e.g., directly via wired or wireless communication connection, indirectly via communication network 110, and/or the like). For example, distributed computing system 108 may include a plurality of computing devices, such as a group of servers, a computer cluster (e.g., a single computer cluster, one or more computer clusters, a plurality of computer clusters, etc.), and/or other like devices. In some non-limiting embodiments or aspects, distributed computing system 108 may include a plurality of resources, such as a plurality of physical resources (e.g., bare metal servers) and/or a plurality of virtual resources (e.g., virtual machines that are run on hardware). In some non-limiting embodiments or aspects, distributed computing system 108 may include a control device (e.g., a central controller, a primary server, a hypervisor, etc.) that operates to control the plurality of resources. In some non-limiting embodiments or aspects, one or more resources of distributed computing system 108 may operate based on a framework, such as Apache Flink, Apache Hadoop, Apache Spark, and/or the like.

Communication network 110 may include one or more wired and/or wireless networks. For example, communication network 110 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
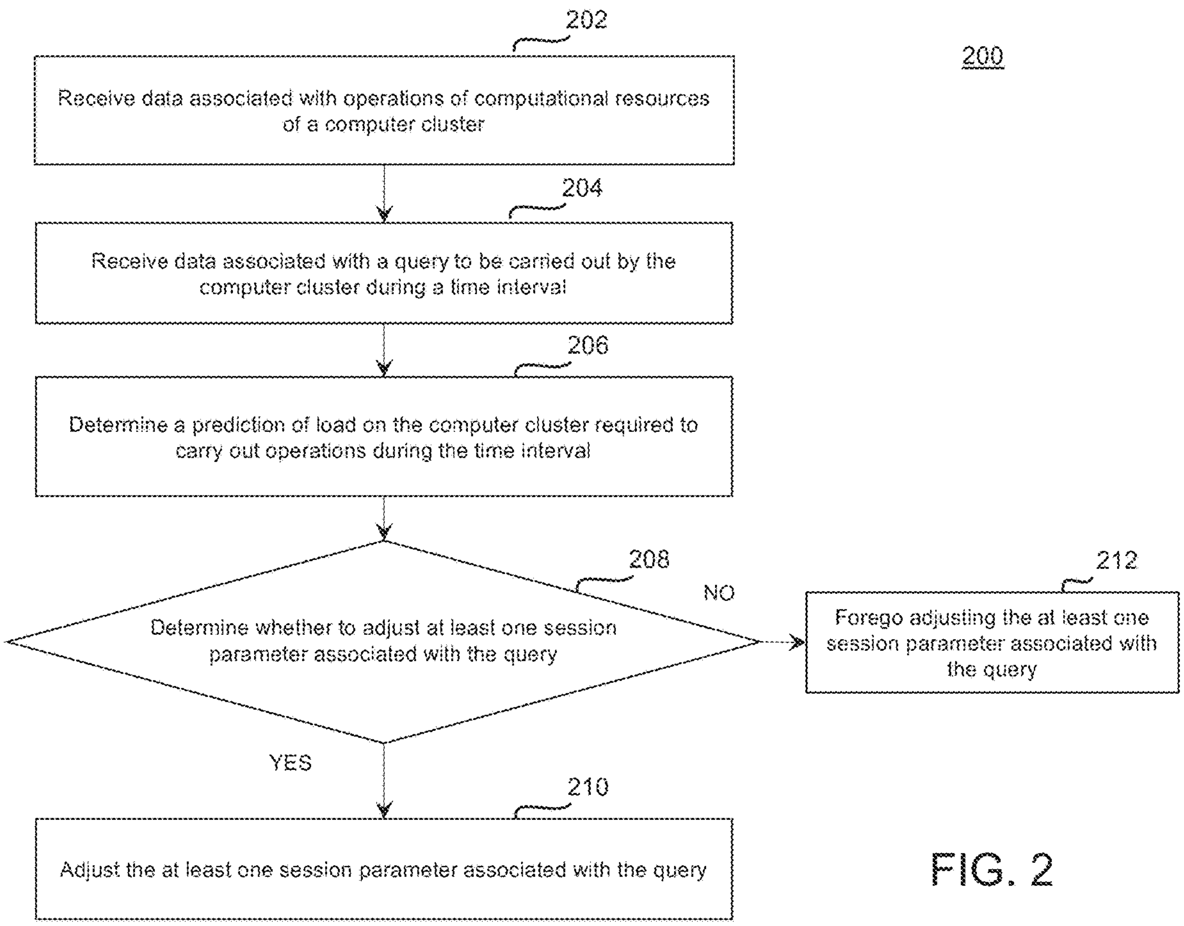
FIG. 2 is a flow diagram for a process for dynamic optimization of complex SQL queries in data lakehouse query engines, according to some non-limiting embodiments or aspects.

Referring now to FIG. 2, shown is a flow diagram for process 200 for dynamic optimization of complex SQL queries in data lakehouse query engines, according to some non-limiting embodiments or aspects. The steps shown in FIG. 2 are for example purposes only. It will be appreciated that additional, fewer, different, and/or different order of steps may be used in non-limiting embodiments or aspects. In some non-limiting embodiments or aspects, a step may be automatically performed in response to performance and/or completion of a prior step. In some non-limiting embodiments or aspects, process 200 may be performed during a training process. In some non-limiting embodiments or aspects, one or more of the steps of process 200 may be performed (e.g., completely, partially, and/or the like) by query management system 102 (e.g., at least one computing device of query management system 102). In some non-limiting embodiments or aspects, one or more of the steps of process 200 may be performed (e.g., completely, partially, and/or the like) by another system, another device, another group of systems, or another group of devices, separate from or including query management system 102, such as ML model database 104, user device 106, distributed computing system 108, and/or the like.

As shown in FIG. 2, at step 202, process 200 may include receiving data associated with operations of computational resources of a computer cluster. For example, query management system 102 may receive the data associated with operations of computational resources of a computer cluster. In some non-limiting embodiments or aspects, the data associated with operations of computational resources of a computer cluster may include cumulative resource data of the computer cluster (e.g., RAM usage, average CPU usage, total processors, total cluster memory, etc.). In some non-limiting embodiments or aspects, query management system 102 may receive real time data associated with operations of computational resources of the computer cluster.

As shown in FIG. 2, at step 204, process 200 may include receiving data associated with a query to be carried out by the computer cluster during a time interval. For example, query management system 102 may receive the data associated with a query to be carried out by the computer cluster during a time interval. In some non-limiting embodiments or aspects, the data associated with a query to be carried out by the computer cluster during the time interval may include at least one session parameter associated with the query. In some non-limiting embodiments or aspects, the at least one session parameter associated with the query may include at least one of the following: a parameter associated with task concurrency for the computer cluster, a parameter associated with resource overcommit for the computer cluster, a parameter associated with a maximum hash partition count, a parameter associated with a join distribution type of the query, a parameter associated with an execution policy for the query, or any combination thereof.

In some non-limiting embodiments or aspects, the query may include an SQL query. In some non-limiting embodiments or aspects, query management system 102 may receive data associated with an SQL query to be carried out by the computer cluster during the time interval.

As shown in FIG. 2, at step 206, process 200 may include determining a prediction of load on the computer cluster required to carry out operations during the time interval. For example, a cluster load machine learning model may determine the prediction of load on the computer cluster required to carry out operations during the time interval.

In some non-limiting embodiments or aspects, query management system 102 may provide an input to a cluster load machine learning model to generate an output of the cluster load machine learning model. The output may include a prediction of load on the computer cluster required to carry out operations during the time interval. In this way, by utilizing the cluster load machine learning model, the cluster load machine learning model may leverage machine learning to predict query load trends and allow for proactive system adjustments as compared to reactive methods, which may prevent penalties or failures from sudden load spikes on a computer cluster.

In some non-limiting embodiments or aspects, when providing the input to a cluster load machine learning model to generate the output of the cluster load machine learning model, query management system 102 may provide real time (e.g., in a live situation, such as a time at which or close to a time at which operations, such as operations of query management system 102 or other systems or devices, are carried out) data associated with operations of computational resources of the computer cluster as the input to a cluster load machine learning model to generate the output of the cluster load machine learning model. In this way, by utilizing real time data, query management system 102 may ensure optimal resource allocation as compared to static configurations, which may allow for dynamic adjustments to improve system performance.

In some non-limiting embodiments or aspects, query management system 102 may generate the output of the cluster load machine learning model. In some non-limiting embodiments or aspects, the output may include a prediction of real time load on the computer cluster required to carry out operations during the time interval for the query.

In some non-limiting embodiments or aspects, query management system 102 may train the cluster load machine learning model based on historical time-series data associated with operations of computational resources of the computer cluster. In some non-limiting embodiments or aspects, the historical time-series data associated with operations of computational resources of the computer cluster comprises a plurality of timestamps associated with a plurality of features, wherein the plurality of features associated with each timestamp comprises at least one of the following: a feature associated with a number of concurrent queries for the computer cluster, a feature associated with an amount of memory available for the computer cluster, a feature associated with an amount of central processing unit resource available for the computer cluster, a feature associated with a number of threads for the computer cluster, a feature associated with an amount of information transmitted in a network associated with the computer cluster, or any combination thereof.

As shown in FIG. 2, at step 208, process 200 may include determining whether to adjust at least one session parameter associated with the query. For example, query management system 102 may determine whether to adjust (e.g., tune, modify, change, etc.) at least one session parameter associated with the query. In some non-limiting embodiments or aspects, query management system 102 may determine whether to adjust at least one session parameter associated with the query based on an output of the cluster load machine learning model, the data associated with the computational resources of the computer cluster, and the data associated with a query to be carried out by the computer cluster. In some non-limiting embodiments or aspects, query management system 102 may determine to adjust at least one session parameter associated with the SQL query.

As shown in FIG. 2, at step 210 ("YES"), process 200 may include adjusting (e.g., automatically adjusting) the at least one session parameter associated with the query. For example, query management system 102 may adjust the at least one session parameter associated with the query based on determining to adjust the at least one session parameter associated with the query. In some non-limiting embodiments or aspects, query management system 102 may generate an adjusted query based on adjusting the at least one session parameter associated with the query. In some non-limiting embodiments or aspects, query management system 102 may perform the adjusted query on a data lakehouse based on generating the adjusted query. In this way, by adjusting the at least one session parameter associated with the query, query management system 102 may allow for dynamically tailoring session parameters to individual queries and the current state of a computer cluster automatically as compared to systems that do not provide for an end-to-end analysis, which may prevent fully utilizing computer cluster resources.

As shown in FIG. 2, at step 212 ("NO"), process 200 may include foregoing adjusting the at least one session parameter associated with the query. For example, query management system 102 may forego adjusting the at least one session parameter associated with the query based on determining not to adjust the at least one session parameter associated with the query. In some non-limiting embodiments or aspects, query management system 102 may perform the query (e.g., the unadjusted query) on a data lakehouse based on foregoing adjusting the at least one session parameter associated with the query.

Referring now to FIGS. 3A-3F, shown are schematic diagrams of implementation 300 of a process (e.g., process 200) for dynamic optimization of complex SQL queries in data lakehouse query engines. In some non-limiting embodiments or aspects, one or more of the steps of the process may be performed (e.g., completely, partially, etc.) by query management system 102 (e.g., one or more devices of query management system 102). In some non-limiting embodiments or aspects, one or more of the steps of the process may be performed (e.g., completely, partially, etc.) by another device or a group of devices separate from or including query management system 102 (e.g., one or more devices of model management system 102), ML model database 104, client device 306, and/or distributed computing system 108. In some non-limiting embodiments or aspects, client device 306 may be the same as or similar to user device 106.

As shown in FIGS. 3A-3F, query management system 102 may implement a coordinator that includes components of a parser, an analyzer, a planner, and a scheduler for carrying out operations of query management system 102. In some non-limiting embodiments or aspects, the coordinator may operate as a data lakehouse query engine. In some non-limiting embodiments or aspects, query management system 102 may forego implementing a coordinator and carry out operations directly. In addition, as shown in FIGS. 3A-3F, the coordinator of query management system 102 may function based on an SQL query. However, any form of query may be optimized and executed by query management system 102.

Figure 3A:
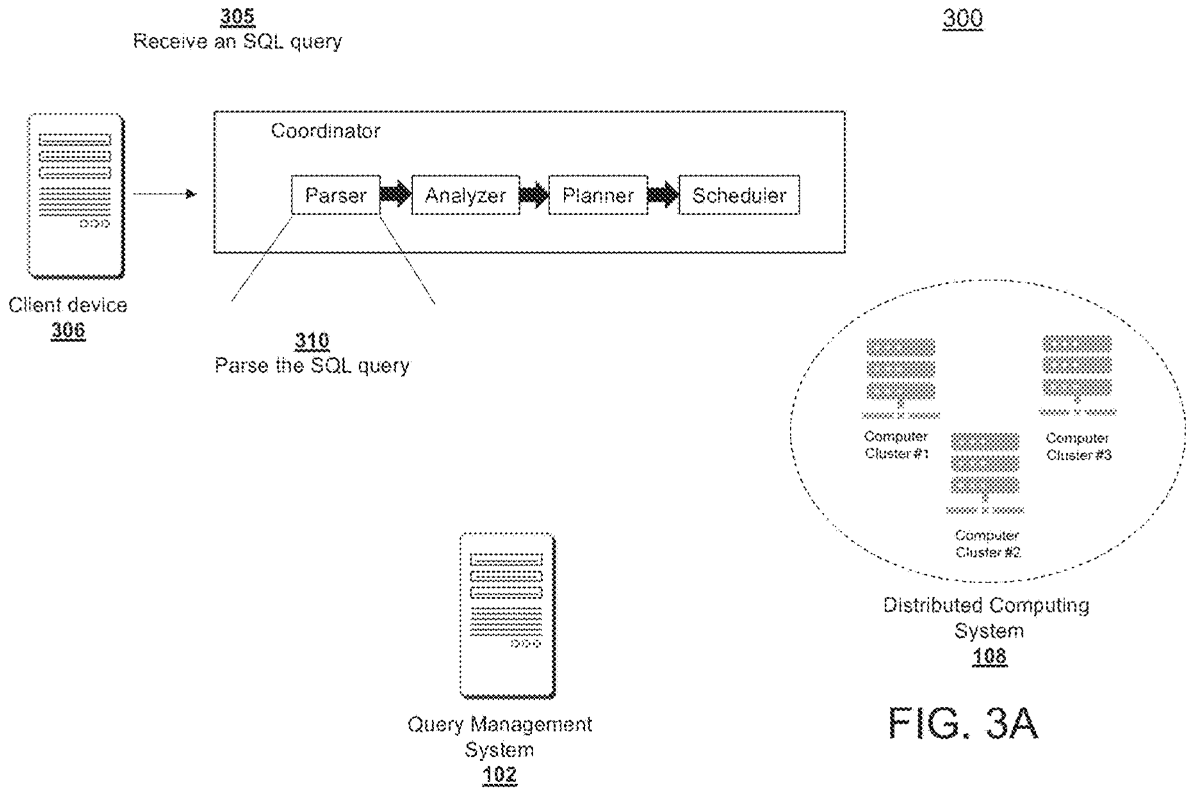
FIGS. 3A-3F are schematic diagrams of an exemplary implementation of a system and/or method for dynamic optimization of complex SQL queries in data lakehouse query engines, according to some non-limiting embodiments or aspects.

As shown by reference number 305 in FIG. 3A, the coordinator of query management system 102 may receive an SQL query from client device 306. As shown by reference number 310 in FIG. 3A, the parser of the coordinator may parse the SQL query. In some non-limiting embodiments or aspects, the parser may provide data associated with the SQL query, where the SQL query is to be carried out by a computer cluster of distributed computing system 108 during a time interval.

Figure 3B:
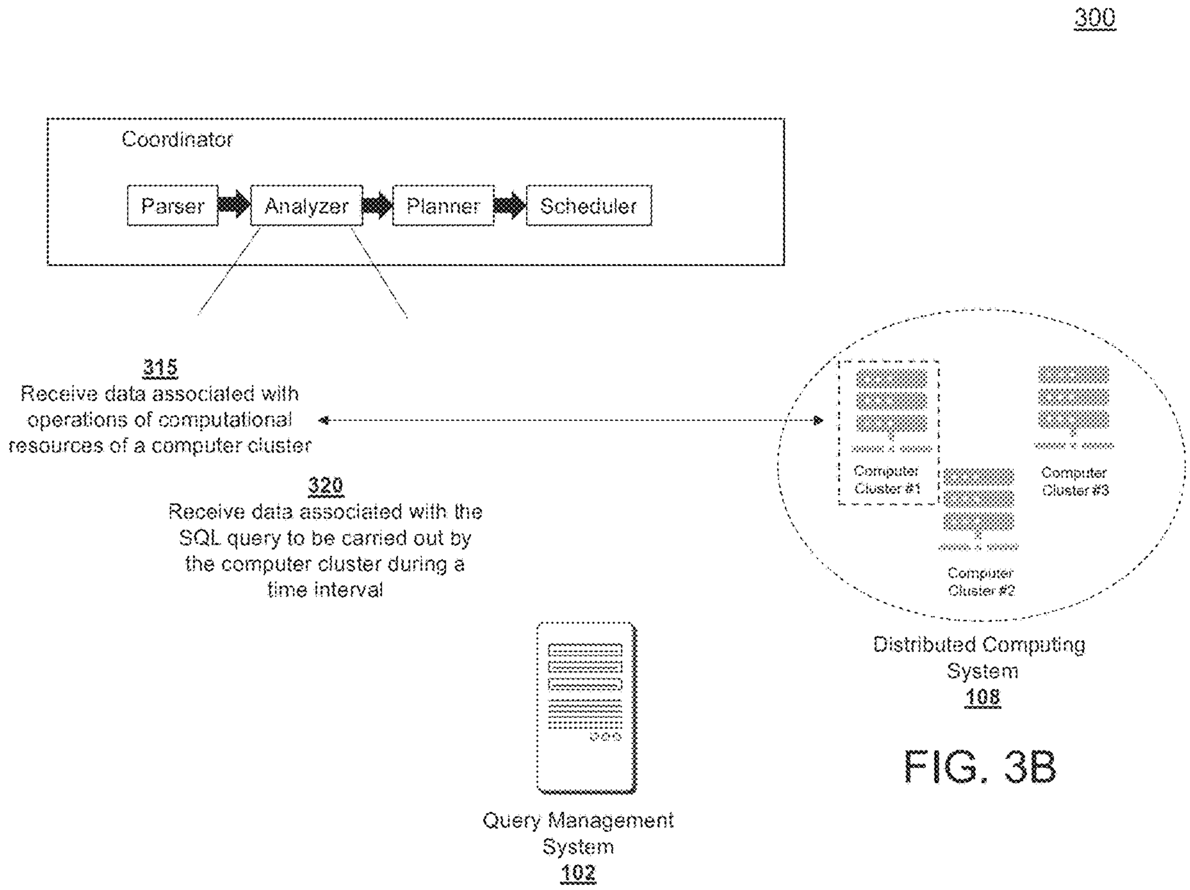

As shown by reference number 315 in FIG. 3B, the analyzer of the coordinator may receive data associated with operations of computational resources of a computer cluster (e.g., computer cluster #1) of distributed computing system 108. In some non-limiting embodiments or aspects, the analyzer may receive real time data associated with operations of computational resources of the computer cluster. In some non-limiting embodiments or aspects, the analyzer may receive the data associated with operations of computational resources of the computer cluster from distributed computing system 108 based on query management system 102 requesting (e.g., transmitting a request for) the data. In some non-limiting embodiments or aspects, the data associated with operations of computational resources of the computer cluster may include time series data associated with a number of concurrent queries for the computer cluster, time series data associated with an amount of memory available for the computer cluster, time series data associated with an amount of central processing unit (CPU) resource (e.g., CPU usage, average CPU usage, etc.) available for the computer cluster, time series data associated with a number of threads for the computer cluster, time series data associated with an amount of information transmitted in a network associated with the computer cluster, and/or time series data associated with an amount of memory resource (e.g., random access memory (RAM) usage, average RAM usage, etc.) available for the computer cluster.

As shown by reference number 320 in FIG. 3B, the analyzer may receive data associated with the SQL query to be carried out by the computer cluster during a time interval. In some non-limiting embodiments or aspects, the analyzer may receive the data associated with the SQL query from the parser. In some non-limiting embodiments or aspects, the time interval for which the SQL query is to be carried out may be a time interval that is within a predetermined period of time from when the SQL query was received from client device 306. In some non-limiting embodiments or aspects, the time interval may be a time period of a predetermined duration.

Figure 3C:
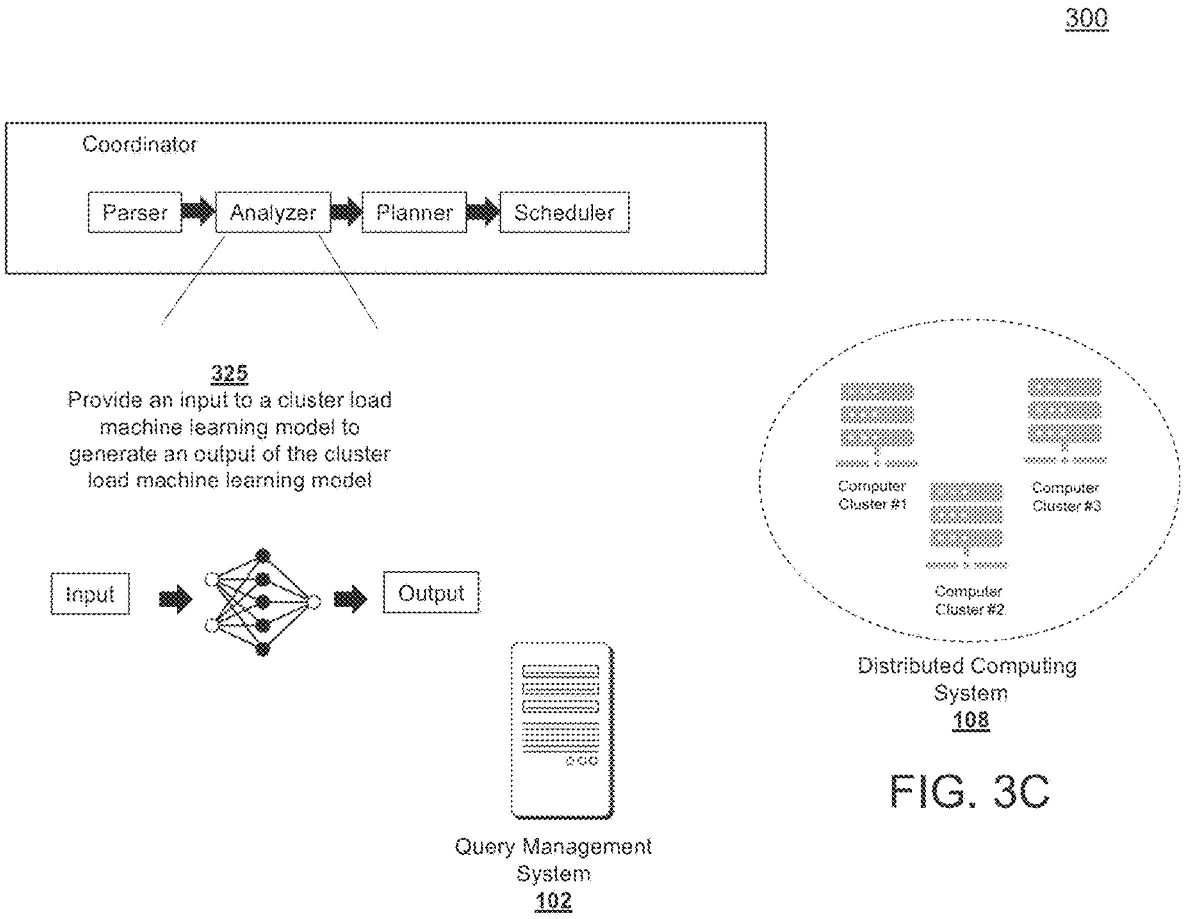

As shown by reference number 325 in FIG. 3C, the analyzer may provide an input to a cluster load machine learning model to generate an output of the cluster load machine learning model. In some non-limiting embodiments or aspects, the analyzer may provide the data (e.g., the real time data) associated with operations of computational resources of the computer cluster as the input. Additionally or alternatively, the analyzer may provide data associated with a time interval (e.g., a time period, a time period of a predetermined duration, a time period between a first timestamp and a second timestamp, etc.) as the input. In some non-limiting embodiments or aspects, the output of the cluster load machine learning model may include a prediction of load on the computer cluster required to carry out operations during the time interval at which the SQL query is to be carried out (e.g., a time interval that is later in time as compared to a time interval provided as an input to the cluster load machine learning model).

Figure 3D:
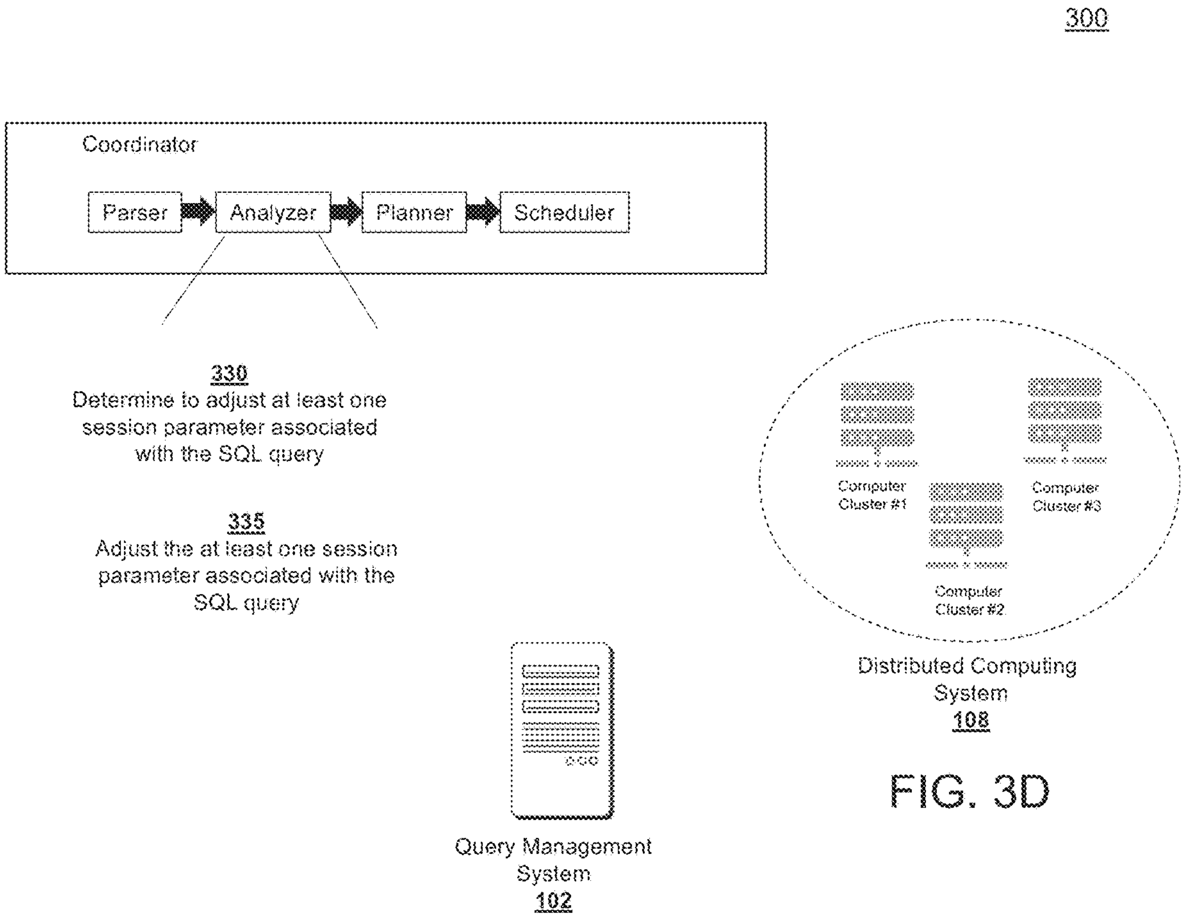

As shown by reference number 330 in FIG. 3D, the analyzer may determine to adjust at least one session parameter associated with the SQL query. In some non-limiting embodiments or aspects, the analyzer may determine to adjust at least one session parameter associated with the SQL query based on the output of the cluster load machine learning model, the data associated with computational resources of the computer cluster, and/or the data associated with the SQL query to be carried out by the computer cluster. In some non-limiting embodiments or aspects, the at least one session parameter associated with the SQL query may include a parameter associated with task concurrency (e.g., which allows for modification of the tasks of a specific query) for the computer cluster, a parameter associated with resource overcommit (e.g., which allows a query to use memory beyond the set limit) for the computer cluster, a parameter associated with a maximum hash partition count (e.g., which determines a maximum number of partitions for processing distributed operations, such as joins, aggregations, partitioned window functions, etc.), a parameter associated with a join distribution type (e.g., which specifies the type of join used in a query) of the query, a parameter associated with an execution policy (e.g., which allows stages of a query to be run all at once or in phases) for the query, or any combination thereof.

As shown by reference number 335 in FIG. 3D, the analyzer may adjust the at least one session parameter associated with the SQL query based on determining to adjust the at least one session parameter associated with the SQL query. In some non-limiting embodiments or aspects, the analyzer may set a memory restriction and a parameter associated with a maximum number of partitions for processing distributed operations, such as joins, aggregations, partitioned window functions, and/or the like (e.g., max_hash_partition_count) for the SQL query based on time series data associated with an amount of memory resource available for the computer cluster. In some non-limiting embodiments or aspects, the analyzer may set a parameter associated with modification of tasks (e.g., task_concurrency) of the SQL query based on the time series data associated with an amount of CPU available for the computer cluster. In some non-limiting embodiments or aspects, the analyzer may identify a query type and set a parameter associated with execution of stages of the SQL query to be run all at once or in phases (e.g., execution_policy) and/or a parameter associated with a type of join used in the SQL query (e.g., join_distribution_type).

Figure 3E:
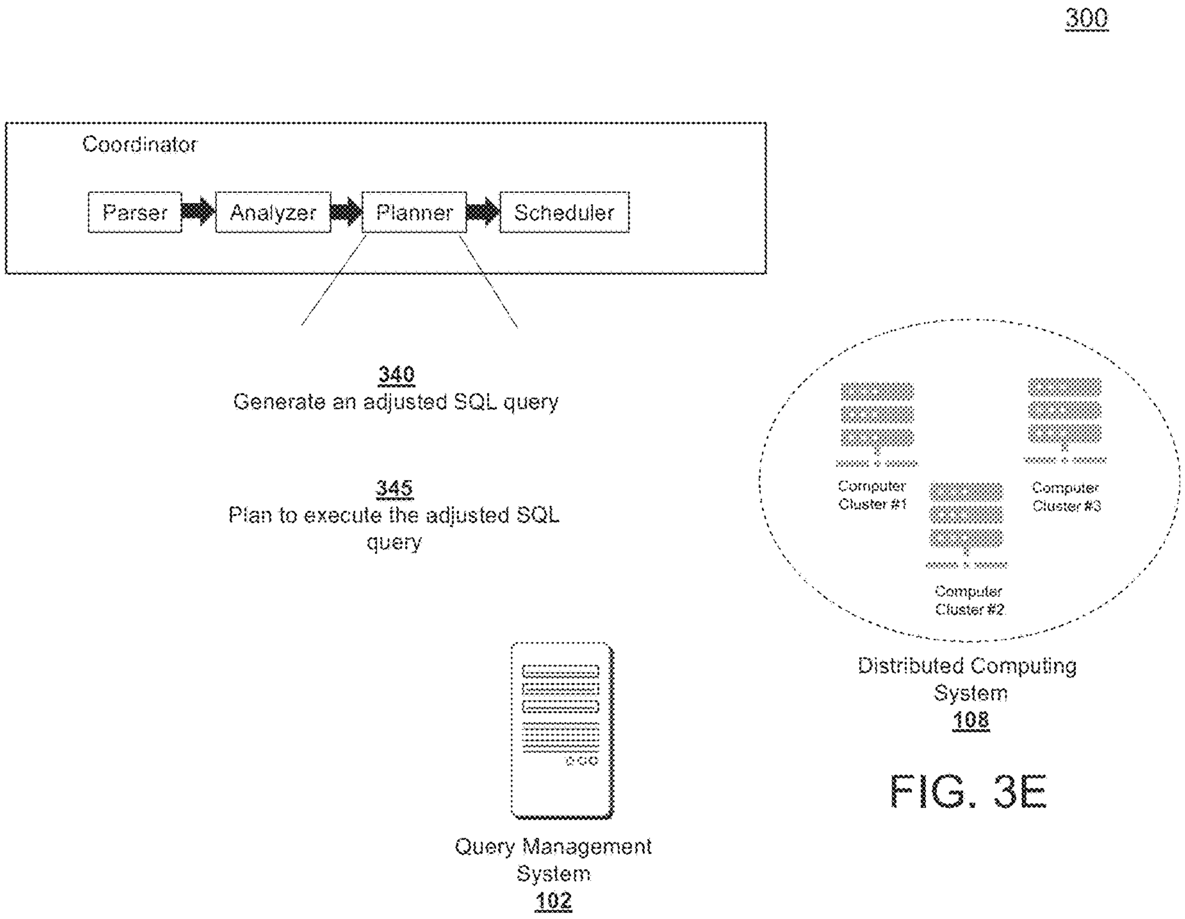

As shown by reference number 340 in FIG. 3E, the planner of the coordinator may generate an adjusted SQL query based on adjusting the at least one session parameter associated with the SQL query. As shown by reference number 345 in FIG. 3E, the planner may plan (e.g., generate a plan) to execute the adjusted SQL query.

Figure 3F:
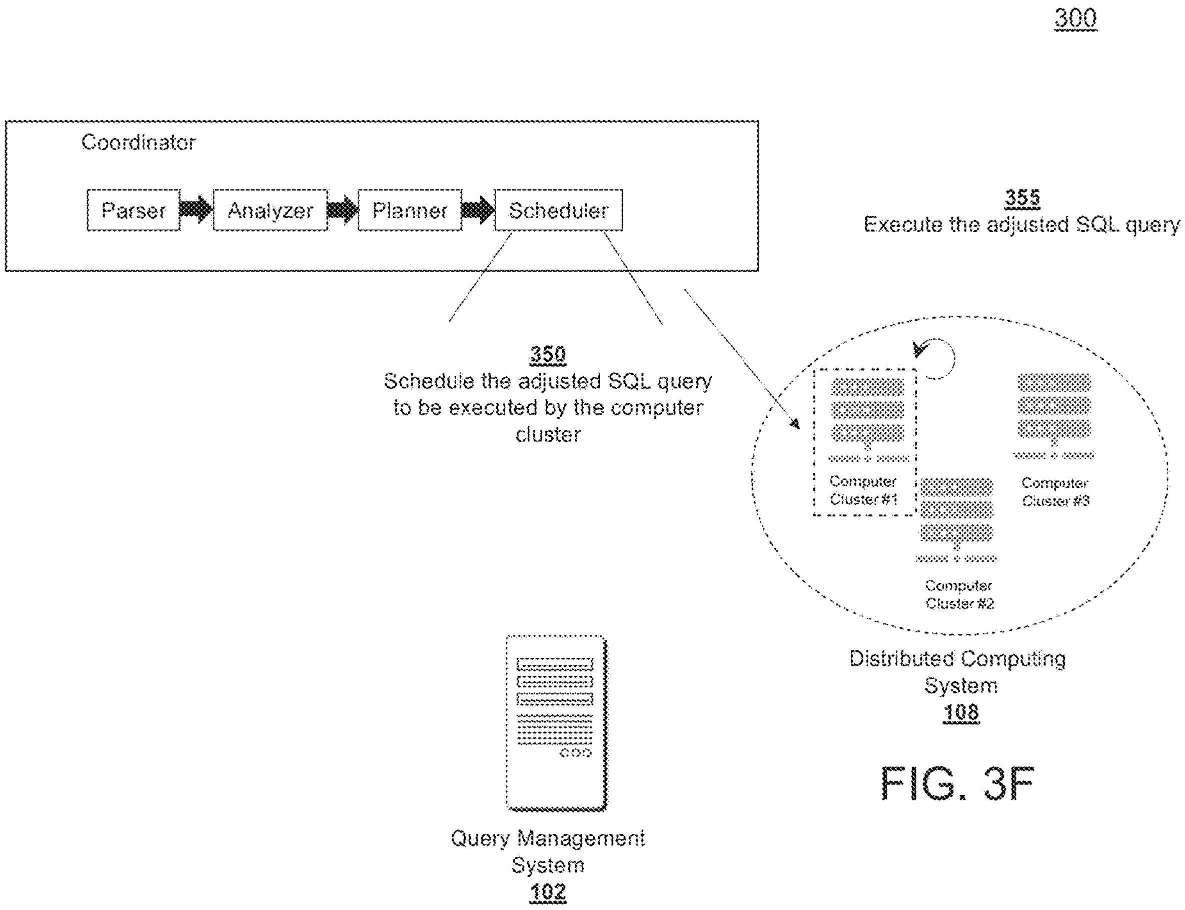

As shown by reference number 350 in FIG. 3F, the scheduler of the coordinator may schedule the adjusted SQL query to be executed by the computer cluster. As shown by reference number 355 in FIG. 3F, the computer cluster may execute the adjusted SQL query. In some non-limiting embodiments or aspects, the results of the adjusted SQL query may be provided to client device 306 (e.g., by query management system 102 and/or by the computer cluster of distributed computing system 108 or another component of distributed computing system 108).

Figure 4:
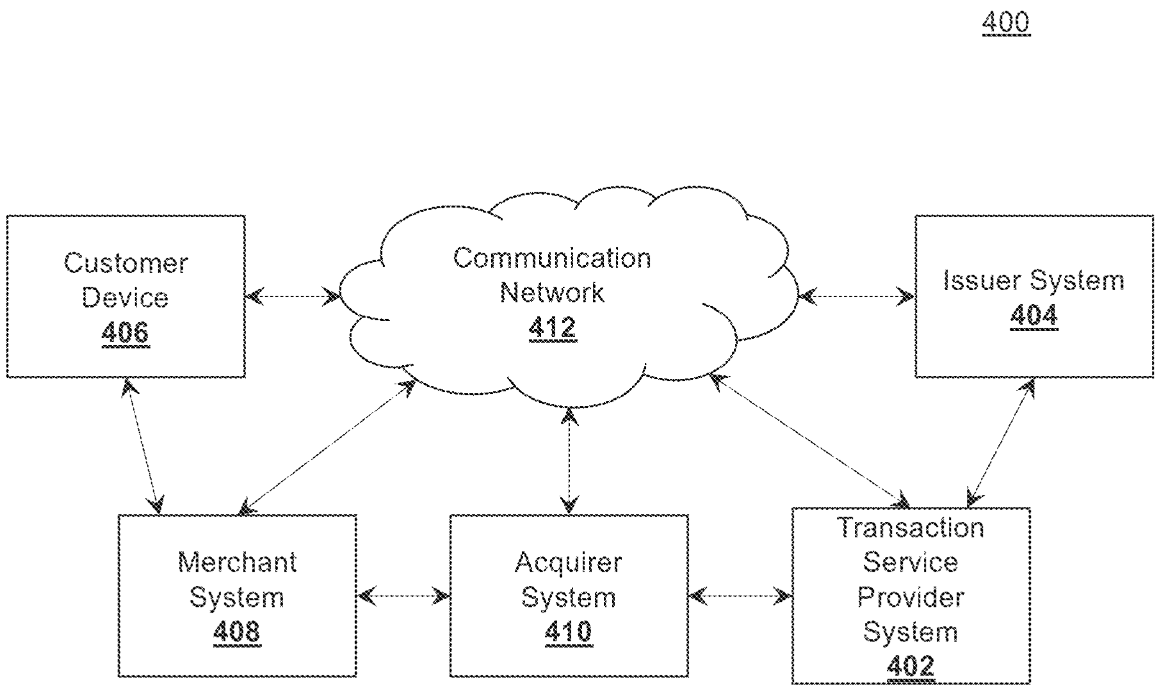
FIG. 4 is a diagram of an exemplary environment in which methods, systems, and/or computer program products, described herein, may be implemented, according to some non-limiting embodiments or aspects.

Referring now to FIG. 4, shown is a diagram of a non-limiting embodiment or aspect of exemplary environment 400 in which methods, systems, and/or products, as described herein, may be implemented. As shown in FIG. 4, environment 400 may include transaction service provider system 402, issuer system 404, customer device 406, merchant system 408, acquirer system 410, and communication network 412. In some non-limiting embodiments or aspects, each of query management system 102, ML model database 104, and/or user device 106 of FIG. 1 may be implemented by (e.g., part of) transaction service provider system 402. In some non-limiting embodiments or aspects, at least one of query management system 102, ML model database 104, user device 106, and/or distributed computing system 108 of FIG. 1 may be implemented by (e.g., part of) another system, another device, another group of systems, or another group of devices, separate from or including transaction service provider system 402, such as issuer system 404, customer device 406, merchant system 408, acquirer system 410, and/or the like.

Transaction service provider system 402 may include one or more devices capable of receiving information from and/or communicating information to issuer system 404, customer device 406, merchant system 408, and/or acquirer system 410 via communication network 412. For example, transaction service provider system 402 may include a computing device, such as a server (e.g., a transaction processing server), a group of servers, and/or other like devices. In some non-limiting embodiments or aspects, transaction service provider system 402 may be associated with a transaction service provider, as described herein. In some non-limiting embodiments or aspects, transaction service provider system 402 may be in communication with a data storage device, which may be local or remote to transaction service provider system 402. In some non-limiting embodiments or aspects, transaction service provider system 402 may be capable of receiving information from, storing information in, communicating information to, or searching information stored in the data storage device.

Issuer system 404 may include one or more devices capable of receiving information and/or communicating information to transaction service provider system 402, customer device 406, merchant system 408, and/or acquirer system 410 via communication network 412. For example, issuer system 404 may include a computing device, such as a server, a group of servers, and/or other like devices. In some non-limiting embodiments or aspects, issuer system 404 may be associated with an issuer institution, as described herein. For example, issuer system 404 may be associated with an issuer institution that issued a credit account, debit account, credit card, debit card, and/or the like to a user associated with customer device 406.

Customer device 406 may include one or more devices capable of receiving information from and/or communicating information to transaction service provider system 402, issuer system 404, merchant system 408, and/or acquirer system 410 via communication network 412. Additionally or alternatively, each customer device 406 may include a device capable of receiving information from and/or communicating information to other customer devices 406 via communication network 412, another network (e.g., an ad hoc network, a local network, a private network, a virtual private network, and/or the like), and/or any other suitable communication technique. For example, customer device 406 may include a client device and/or the like. In some non-limiting embodiments or aspects, customer device 406 may or may not be capable of receiving information (e.g., from merchant system 408 or from another customer device 406) via a short-range wireless communication connection (e.g., an NFC communication connection, an RFID communication connection, a Bluetooth® communication connection, a Zigbee® communication connection, and/or the like), and/or communicating information (e.g., to merchant system 408) via a short-range wireless communication connection.

Merchant system 408 may include one or more devices capable of receiving information from and/or communicating information to transaction service provider system 402, issuer system 404, customer device 406, and/or acquirer system 410 via communication network 412. Merchant system 408 may also include a device capable of receiving information from customer device 406 via communication network 412, a communication connection (e.g., an NFC communication connection, an RFID communication connection, a Bluetooth® communication connection, a Zigbee® communication connection, and/or the like) with customer device 406, and/or the like, and/or communicating information to customer device 406 via communication network 412, the communication connection, and/or the like. In some non-limiting embodiments or aspects, merchant system 408 may include a computing device, such as a server, a group of servers, a client device, a group of client devices, and/or other like devices. In some non-limiting embodiments or aspects, merchant system 408 may be associated with a merchant, as described herein. In some non-limiting embodiments or aspects, merchant system 408 may include one or more client devices. For example, merchant system 408 may include a client device that allows a merchant to communicate information to transaction service provider system 402. In some non-limiting embodiments or aspects, merchant system 408 may include one or more devices, such as computers, computer systems, and/or peripheral devices capable of being used by a merchant to conduct a transaction with a user. For example, merchant system 408 may include a POS device and/or a POS system.

Acquirer system 410 may include one or more devices capable of receiving information from and/or communicating information to transaction service provider system 402, issuer system 404, customer device 406, and/or merchant system 408 via communication network 412. For example, acquirer system 410 may include a computing device, a server, a group of servers, and/or the like. In some non-limiting embodiments or aspects, acquirer system 410 may be associated with an acquirer, as described herein.

Communication network 412 may include one or more wired and/or wireless networks. For example, communication network 412 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 4 are provided as an example. There may be additional systems, devices, and/or networks; fewer systems, devices, and/or networks; different systems, devices, and/or networks; and/or differently arranged systems, devices, and/or networks than those shown in FIG. 4. Furthermore, two or more systems or devices shown in FIG. 4 may be implemented within a single system or device, or a single system or device shown in FIG. 4 may be implemented as multiple, distributed systems or devices. Additionally or alternatively, a set of systems (e.g., one or more systems) or a set of devices (e.g., one or more devices) of environment 400 may perform one or more functions described as being performed by another set of systems or another set of devices of environment 400.

Figure 5:
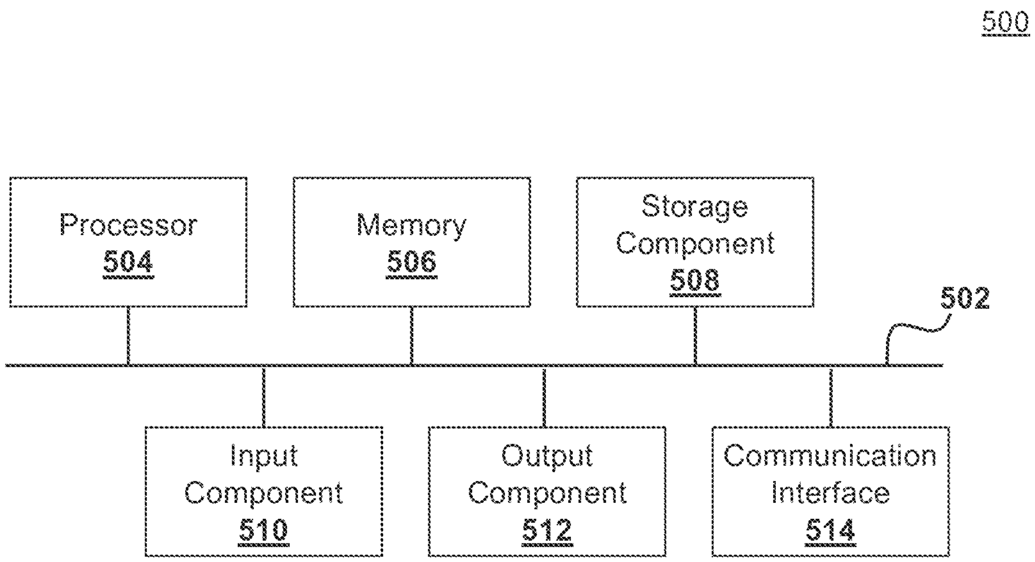
FIG. 5 is a schematic diagram of example components of one or more devices of FIG. 1 and/or FIG. 3, according to some non-limiting embodiments or aspects.

Referring now to FIG. 5, shown is a diagram of example components of device 500, according to some non-limiting embodiments or aspects. Device 500 may correspond to at least one of query management system 102, ML model database 104, and/or user device 106 in FIG. 1 and/or at least one of transaction service provider system 402, issuer system 404, customer device 406, merchant system 408, and/or acquirer system 410 in FIG. 4, as an example. In some non-limiting embodiments or aspects, such systems or devices in FIG. 1 or FIG. 4 may include at least one device 500 and/or at least one component of device 500. The number and arrangement of components shown in FIG. 5 are provided as an example. In some non-limiting embodiments or aspects, device 500 may include additional components, fewer components, different components, or differently arranged components than those shown in FIG. 5. Additionally or alternatively, a set of components (e.g., one or more components) of device 500 may perform one or more functions described as being performed by another set of components of device 500.

As shown in FIG. 5, device 500 may include bus 502, processor 504, memory 506, storage component 508, input component 510, output component 512, and communication interface 514. Bus 502 may include a component that permits communication among the components of device 500. In some non-limiting embodiments or aspects, processor 504 may be implemented in hardware, firmware, or a combination of hardware and software. For example, processor 504 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 506 may include random access memory (RAM), read only memory (ROM), and/or another type of dynamic or static storage device (e.g., flash memory, magnetic memory, optical memory, etc.) that stores information and/or instructions for use by processor 504.

With continued reference to FIG. 5, storage component 508 may store information and/or software related to the operation and use of device 500. For example, storage component 508 may include a hard disk (e.g., a magnetic disk, an optical disk, a magneto-optic disk, a solid-state disk, etc.) and/or another type of computer-readable medium. Input component 510 may include a component that permits device 500 to receive information, such as via user input (e.g., a touch screen display, a keyboard, a keypad, a mouse, a button, a switch, a microphone, etc.). Additionally or alternatively, input component 510 may include a sensor for sensing information (e.g., a global positioning system (GPS) component, an accelerometer, a gyroscope, an actuator, etc.). Output component 512 may include a component that provides output information from device 500 (e.g., a display, a speaker, one or more light-emitting diodes (LEDs), etc.). Communication interface 514 may include a transceiver-like component (e.g., a transceiver, a separate receiver and transmitter, etc.) that enables device 500 to communicate with other devices, such as via a wired connection, a wireless connection, or a combination of wired and wireless connections. Communication interface 514 may permit device 500 to receive information from another device and/or provide information to another device. For example, communication interface 514 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 500 may perform one or more processes described herein. Device 500 may perform these processes based on processor 504 executing software instructions stored by a computer-readable medium, such as memory 506 and/or storage component 508. A computer-readable medium may include any non-transitory memory device. A memory device includes memory space located inside of a single physical storage device or memory space spread across multiple physical storage devices. Software instructions may be read into memory 506 and/or storage component 508 from another computer-readable medium or from another device via communication interface 514. When executed, software instructions stored in memory 506 and/or storage component 508 may cause processor 504 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system, comprising:

at least one processor configured to:

train a cluster load machine learning model based on historical time-series data associated with operations of computational resources of a computer cluster of a distributed computing system, wherein the historical time-series data associated with operations of computational resources of the computer cluster comprises a plurality of timestamps associated with a plurality of features, and wherein the plurality of features associated with each timestamp comprises at least one of the following:

a feature associated with a number of concurrent queries for the computer cluster;

a feature associated with an amount of memory available for the computer cluster;

a feature associated with an amount of central processing unit resources available for the computer cluster;

a feature associated with a number of threads for the computer cluster;

a feature associated with an amount of information transmitted in a network associated with the computer cluster; or any combination thereof;

receive real time data associated with operations of computational resources of a computer cluster of the distributed computing system;

receive data associated with a Structured Query Language (SQL) query to be carried out by the computer cluster during a time interval, wherein the time interval comprises a time interval that is within a predetermined period of time from when the SQL query was received from a client device;

provide the real time data associated with operations of computational resources of a computer cluster as an input to a cluster load machine learning model to generate an output of the cluster load machine learning model, wherein the output comprises a prediction of load on the computer cluster required to carry out operations during the time interval at which the SQL query is to be carried out;

determine whether to adjust at least one session parameter associated with the SQL query based on the output of the cluster load machine learning model and the data associated with the SQL query to be carried out by the computer cluster, wherein the at least one session parameter associated with the SQL query comprises at least one of the following:

a parameter associated with a maximum hash partition count:

a parameter associated with a join distribution type of the SQL query:

a parameter associated with an execution policy for the SQL query; or any combination thereof;

adjust the at least one session parameter associated with the SQL query based on determining to adjust the at least one session parameter associated with the SQL query;

generate an adjusted SQL query based on adjusting the at least one session parameter associated with the SQL query; and forego adjusting the at least one session parameter associated with the SQL query based on determining not to adjust the at least one session parameter associated with the SQL query.

2. The system of claim 1, wherein the at least one session parameter associated with the SQL query further comprises at least one of the following:

a parameter associated with task concurrency for the computer cluster;

a parameter associated with resource overcommit for the computer cluster;

or any combination thereof.

3. The system of claim 1 wherein the plurality of features associated with each timestamp comprises:

the feature associated with a number of concurrent queries for the computer cluster;

the feature associated with an amount of memory available for the computer cluster;

the feature associated with an amount of central processing unit resources available for the computer cluster;

the feature associated with a number of threads for the computer cluster; and the feature associated with an amount of information transmitted in a network associated with the computer cluster.

4. The system of claim 1, wherein the at least one processor is further configured to:

perform the adjusted SQL query on a data lakehouse based on generating the adjusted SQL query.

5. The system of claim 1, wherein, when determining whether to adjust the at least one session parameter associated with the SQL query, the at least one processor is configured to:

determine to adjust the at least one session parameter associated with the SQL query.

6. A computer-implemented method, comprising:

training, with at least one processor, a cluster load machine learning model based on historical time-series data associated with operations of computational resources of a computer cluster of a distributed computing system, wherein the historical time-series data associated with operations of computational resources of the computer cluster comprises a plurality of timestamps associated with a plurality of features, and wherein the plurality of features associated with each timestamp comprises at least one of the following:

a feature associated with a number of concurrent queries for the computer cluster;

a feature associated with an amount of memory available for the computer cluster;

a feature associated with an amount of central processing unit resource available for the computer cluster;

a feature associated with a number of threads for the computer cluster; or a feature associated with an amount of information transmitted in a network associated with the computer cluster;

receiving, with at least one processor, real time data associated with operations of computational resources of a computer cluster of the distributed computing system;

receiving, with at least one processor, data associated with a Structured Query Language (SQL) query to be carried out by the computer cluster during a time interval, wherein the time interval comprises a time interval that is within a predetermined period of time from when the SQL query was received from a client device;

providing, with at least one processor, the real time data associated with operations of computational resources of a computer cluster as an input to a cluster load machine learning model to generate an output of the cluster load machine learning model, wherein the output comprises a prediction of load on the computer cluster required to carry out operations during the time interval at which the SQL query is to be carried out;

determining, with at least one processor, whether to adjust at least one session parameter associated with the SQL query based on the output of the cluster load machine learning model and the data associated with the SQL query to be carried out by the computer cluster, wherein the at least one session parameter associated with the SQL query comprises at least one of the following:

a parameter associated with a maximum hash partition count;

a parameter associated with a join distribution type of the SQL query;

a parameter associated with an execution policy for the SQL query; or any combination thereof; and adjusting, with at least one processor, the at least one session parameter associated with the SQL query based on determining to adjust the at least one session parameter associated with the SQL query; and generating, with at least one processor, an adjusted SQL query based on adjusting the at least one session parameter associated with the SQL query.

7. The computer-implemented method of claim 6, wherein the at least one session parameter associated with the SQL query further comprises at least one of the following:

a parameter associated with task concurrency for the computer cluster;

a parameter associated with resource overcommit for the computer cluster;

or any combination thereof.

8. The computer-implemented method of claim 6 wherein the plurality of features associated with each timestamp comprises:

the feature associated with a number of concurrent queries for the computer cluster;

the feature associated with an amount of memory available for the computer cluster;

the feature associated with an amount of central processing unit resources available for the computer cluster;

the feature associated with a number of threads for the computer cluster; and the feature associated with an amount of information transmitted in a network associated with the computer cluster.

9. The computer-implemented method of claim 6, further comprising:

performing the adjusted SQL query on a data lakehouse based on generating the adjusted SQL query.

10. The computer-implemented method of claim 6, wherein determining whether to adjust the at least one session parameter associated with the SQL query comprises:

determining to adjust the at least one session parameter associated with the SQL query.

11. A computer program product, comprising at least one non-transitory computer-readable medium including program instructions that, when executed by at least one processor, cause the at least one processor to:

train a cluster load machine learning model based on historical time-series data associated with operations of computational resources of a computer cluster of a distributed computing system, wherein the historical time-series data associated with operations of computational resources of the computer cluster comprises a plurality of timestamps associated with a plurality of features, and wherein the plurality of features associated with each timestamp comprises at least one of the following:

a feature associated with a number of concurrent queries for the computer cluster;

a feature associated with an amount of memory available for the computer cluster;

a feature associated with an amount of central processing unit resource available for the computer cluster;

a feature associated with a number of threads for the computer cluster; or a feature associated with an amount of information transmitted in a network associated with the computer cluster; or any combination thereof;

receive real-time data associated with operations of computational resources of a computer cluster of the distributed computing system;

receive data associated with a Structured Query Language (SQL) query to be carried out by the computer cluster during a time interval, wherein the time interval comprises a time interval that is within a predetermined period of time from when the SQL query was received from a client device;

provide the real time data associated with operations of computational resources of a computer cluster as an input to a cluster load machine learning model to generate an output of the cluster load machine learning model, wherein the output comprises a prediction of load on the computer cluster required to carry out operations during the time interval at which the SQL query is to be carried out;

determine whether to adjust at least one session parameter associated with the SQL query based on the output of the cluster load machine learning model and the data associated with the SQL query to be carried out by the computer cluster, wherein the at least one session parameter associated with the SQL query comprises at least one of the following:

a parameter associated with a maximum hash partition count;

a parameter associated with a join distribution type of the SQL query;

a parameter associated with an execution policy for the SQL query; or any combination thereof;

adjust the at least one session parameter associated with the SQL query based on determining to adjust the at least one session parameter associated with the SQL query;

generate an adjusted SQL query based on adjusting the at least one session parameter associated with the SQL query; and forego adjusting the at least one session parameter associated with the SQL query based on determining not to adjust the at least one session parameter associated with the SQL query.

12. The computer program product of claim 11, wherein the at least one session parameter associated with the SQL query further comprises at least one of the following:

a parameter associated with task concurrency for the computer cluster;

a parameter associated with resource overcommit for the computer cluster;

or any combination thereof.

13. The computer program product of claim 11, and wherein the plurality of features associated with each timestamp comprises:

the feature associated with a number of concurrent queries for the computer cluster;

the feature associated with an amount of memory available for the computer cluster;

the feature associated with an amount of central processing unit resources available for the computer cluster;

the feature associated with a number of threads for the computer cluster; and the feature associated with an amount of information transmitted in a network associated with the computer cluster.

14. The computer program product of claim 11, wherein the program instructions further cause the at least one processor to:

perform the adjusted SQL query on a data lakehouse based on generating the adjusted SQL query.

15. The system of claim 1, wherein the at least one processor is further configured to:

receive the SQL query from a client device; and parse the SQL query to provide the data associated with the SQL query to be carried out by the computer cluster during the time interval.

16. The system of claim 1, wherein, when adjusting the at least one session parameter associated with the SQL query, the at least one processor is configured to:

set a memory restriction and a parameter associated with a maximum number of partitions for processing distributed operations for the SQL query, processing aggregations for the SQL query, or processing partitioned window functions for the SQL query based on time series data associated with an amount of memory resource available for the computer cluster;

set a parameter associated with modification of tasks of the SQL query based on the time series data associated with an amount of central processing unit resources available for the computer cluster;

set a parameter associated with execution of stages of the SQL query to be run in phases or all at once; or set a parameter associated with a type of join used in the SQL query.

17. The computer-implemented method of claim 6, further comprising:

receiving the SQL query from a client device; and parsing the SQL query to provide the data associated with the SQL query to be carried out by the computer cluster during the time interval.

18. The computer-implemented method of claim 6, wherein adjusting the at least one session parameter associated with the SQL query comprises:

setting a memory restriction and a parameter associated with a maximum number of partitions for processing distributed operations for the SQL query, processing aggregations for the SQL query, or processing partitioned window functions for the SQL query based on time series data associated with an amount of memory resource available for the computer cluster;

setting a parameter associated with modification of tasks of the SQL query based on the time series data associated with an amount of central processing unit resources available for the computer cluster;

setting a parameter associated with execution of stages of the SQL query to be run in phases or all at once; or setting a parameter associated with a type of join used in the SQL query.

19. The computer program product of claim 11, wherein the program instructions further cause the at least one processor to:

receive the SQL query from a client device; and parse the SQL query to provide the data associated with the SQL query to be carried out by the computer cluster during the time interval.

20. The computer program product of claim 11, wherein the program instructions that cause the at least one processor to adjust the at least one session parameter associated with the SQL query, cause the at least one processor to:

set a memory restriction and a parameter associated with a maximum number of partitions for processing distributed operations for the SQL query, processing aggregations for the SQL query, or processing partitioned window functions for the SQL query based on time series data associated with an amount of memory resource available for the computer cluster;

set a parameter associated with modification of tasks of the SQL query based on the time series data associated with an amount of central processing unit resources available for the computer cluster;

set a parameter associated with execution of stages of the SQL query to be run in phases or all at once; or set a parameter associated with a type of join used in the SQL query.

* * * * *